United States Patent [19]

Hines

[11] Patent Number: 4,653,875
[45] Date of Patent: Mar. 31, 1987

[54] INFINITY DISPLAY APPARATUS USING CYLINDRICAL BEAM-SPLITTERS

[76] Inventor: Stephen P. Hines, 515 N. Jackson St., Apt. 301, Glendale, Calif. 91206

[21] Appl. No.: 667,810

[22] Filed: Nov. 2, 1984

[51] Int. Cl.⁴ .............................................. G02B 17/00
[52] U.S. Cl. ..................................... 350/442; 350/169; 350/433
[58] Field of Search ............... 350/442, 444, 400, 169, 350/602, 433

[56] References Cited
U.S. PATENT DOCUMENTS 3,443,858  5/1969  La Russa ........................ 350/400
3,682,532  8/1972  Myles ........................... 350/169
4,415,239  11/1983 Humphrey ....................... 350/433

*Primary Examiner*—John K. Corbin
*Assistant Examiner*—P. M. Dzierzynski

[57] ABSTRACT

Apparatus for projecting at infinity an image of an object displayed on a convex surface, such as a CRT or rear projection screen. Such apparatus comprises a pair of beam-splitters, preferably cylindrical in shape and arranged such that their respective axes of curvature are perpendicular to one another. Each beam-splitter has an optical power which compliments that of the other, whereby such elements share the image-forming function.

6 Claims, 7 Drawing Figures

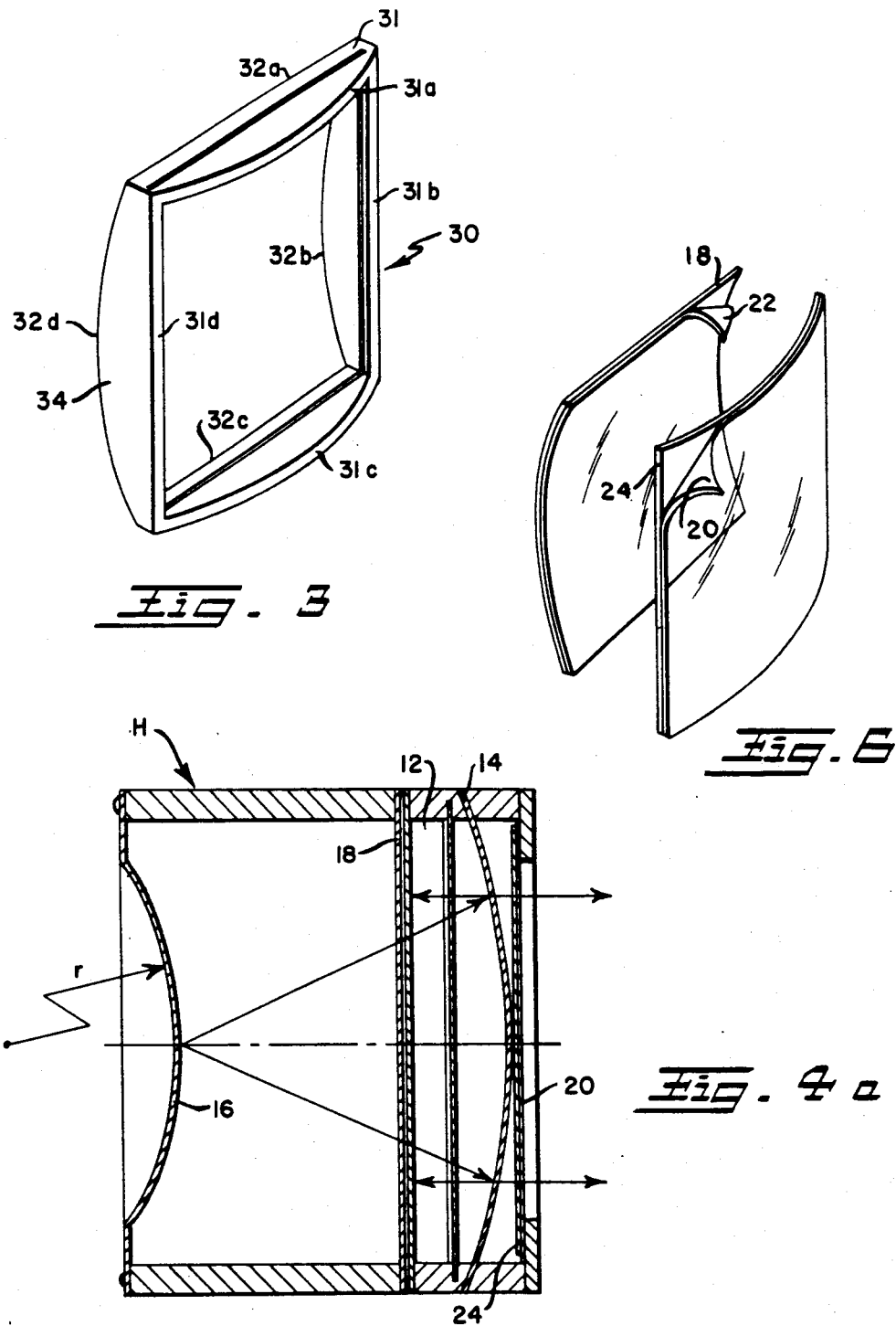

INFINITY DISPLAY APPARATUS USING CYLINDRICAL BEAM-SPLITTERS

BACKGROUND OF THE INVENTION

This invention relates to improvements in so-called "infinity display" apparatus of the type used to project an image at infinity of an object displayed on a convex surface (e.g., a rear projection screen or a cathode ray tube) spaced only a short distance from an observer. Such systems are commonly employed, for exampled, in commercial and space flight simulators used to train pilots and astronauts.

In U.S. Pat. No. 3,443,858, assigned to Farrand Optical Co., there is disclosed a catadioptric optical system for providing and infinity display of an object projected onto a spherically convex diffusing screen. Such a system comprises a pair of 50% beam-splitters positioned on the optical path between the convex screen and the observer. One beam-splitter is spherically cancave, whereas the other one is planar. The combination of these elements positions the diffusing screen at the reflected position of the focus of the concave beam-splitter, in a classical catadioptric imaging system. To an observer, the virtual image of the diffusing screen now appears to be at infinity. A pair of quarter-wave plates and a pair of polarizing plates cooperates to minimize the appearance of ghost images by unwanted object light.

Optically speaking, infinity display systems of the type described above perform their intended function quite satisfactorily. Economically speaking, however, such systems tend to be relatively costly, owing primarily to the manufacturing cost associated with the relatively large aperture concave element. Such elements are commonly fabricated from a large plate of high grade glass which must be precisely ground and polished, and thereafter optically coated. The manufcturing process is slow, tedious and, hence, expensive.

SUMMARY OF THE INVENTION

An object of the invention, therefore, is to provide a low-cost infinity display system of the above type.

According to the invention, this object is achieved by the provision of an infinity display apparatus in which the costly spherically concave beam-splitter, as well as the planar beam-splitter, which characterize the prior art systems, are eliminated and replaced by a pair of relatively low-cost cylindrical beam-splitters having mutually perpendicular axes of curvature. The optical power of each is selected to compliment the optical power of the other so that an image of a convex surface of predetermined shape is projected at infinity. Preferrably, these cylindrical elements are fabricated from flexible sheets of transparent glass or plastic which are cylindrically deformed, such as by a rigid frame. According to an alternative embodiment, a quarter-wave plate and a plane polarizer are integrally associated with each beam-splitter so as to attenuate the appearance of ghost images.

The invention and its various advantages will be best understood from the ensuing detailed description of preferred embodiments, reference being made to the accompanying drawings.

BRIEF DESCRIPTION OF THE DRAWINGS

FIG. 3 is a perspective view of a rigid frame for giving shape to the cylindrical optical elements of the invention;

FIGS. 4a and 4b are cross-sectional views of the FIG. 2 apparatus taken along the section lines 4a—4a and 4b—4b, respectively;

FIG. 6 illustrates an alternative embodiment of the invention.

DETAILED DESCRIPTION OF PREFERRED EMBODIMENTS

Figure 1:
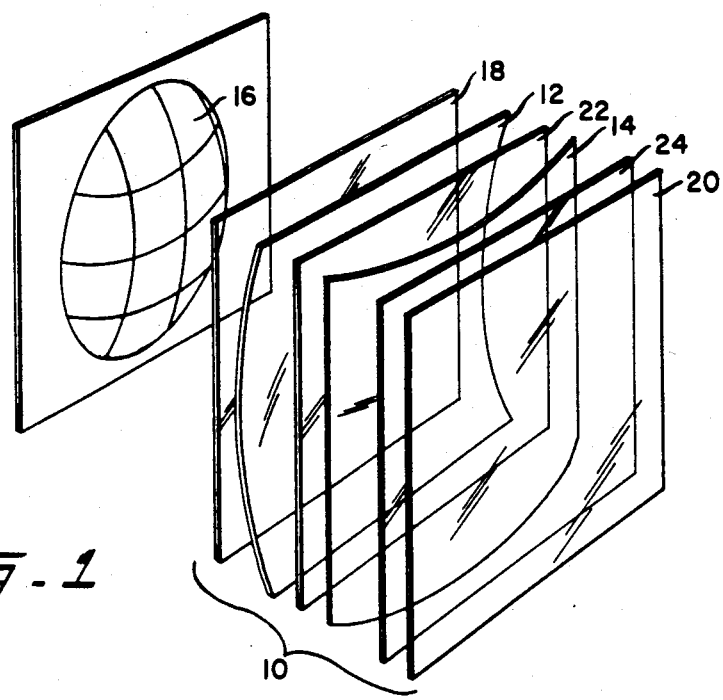
FIG. 1 is a perspective illustration showing the various optical elements of the infinity display apparatus of the invention.

Referring now to the drawings, FIG. 1 illustrates an infinity display apparatus embodying the invention. For illustrative purposes, the spacing between the various optical elements 10 of such apparatus is shown as greatly enlarged. The key optical elements in this embodiment of the invention are a pair of cylindrically curved beam splitters 12 and 14, the axis of curvature of one being arranged perpindicular the the corresponding axis of curvature of the other. These elements, which preferrably absorb a minimal amount of visible light and transmit approximately as much visible light as they reflect, cooperate, in the manner described below, to project an image at infinity of an object displayed on a convex surface 16 (e.g., a rear projection screen on which an optical image is projected, or a cathode ray tube on which an image is displayed by a scanning electron beam). A pair of plane polarizers 18, 20 and a pair of quarter-wave plates 22, 24 serve to attenuate the appearance of undesired ghost images, as explained in detail in the aforementioned '858 patent.

Figure 4B:
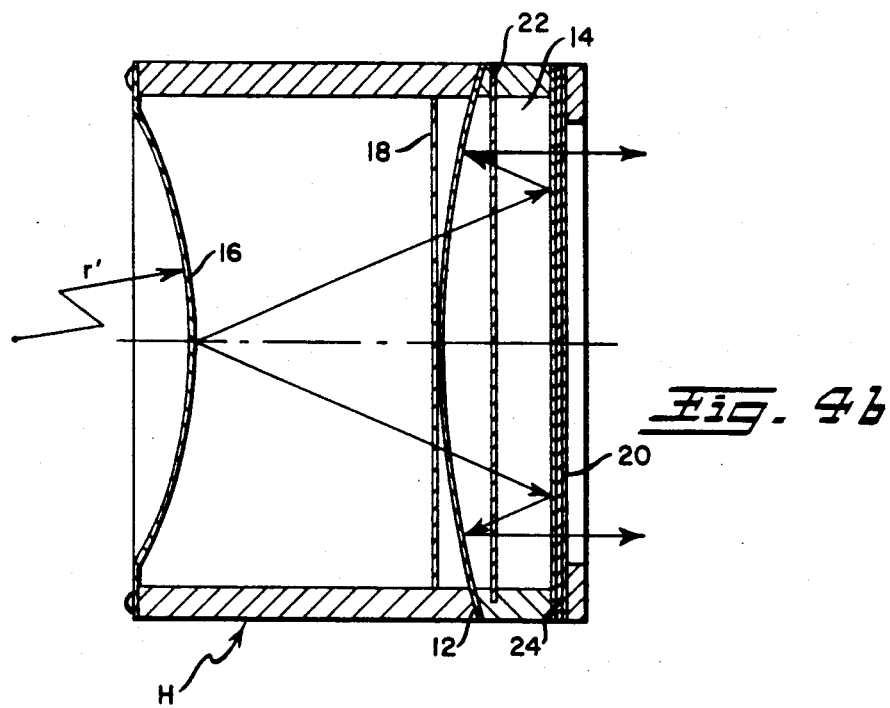
Figure 5:
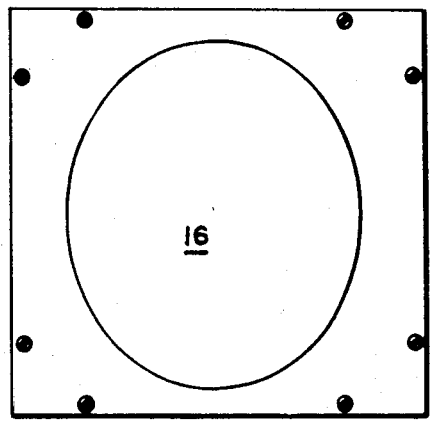
FIG. 5 is a front elevation of a convex screen used in practicing the invention.

Before describing the manner in which cylindrical beam splitters 12 and 14 cooperate in projecting an image at infinity, a few words about the optical properties of cylindrical optical elements are appropriate. As is well known, a cylindrical optical element exhibits optical power in only one plane, such plane being normal to the axis of curvature. In the transverse plane, that is, the plane containing the element's axis of curvature, the optical power is zero. Thus, referring to FIG. 1, beam splitter 14, being cylindrically curved about a vertical axis, will have optical power in only the horizontal plane. Similarly, beam splitter 12, being cylindrically curved about a horizontal axis, will have optical power in only the vertical plane. Thus, in the cylindrical optical system of the invention, the respective optical powers of the cylindrical elements compliment each other so that, ideally, these elements cooperatively exhibit the optical properties of a spherical lens or mirror. Were these elements able to function precisely as a spherical beam-splitter, they would be capable of projecting a non-distorted image at infinity of a spherically convex surface the convex surface 16 having a radius of curvature precisely one-half that of the spherical beam-splitter. However, in a cylindrical imaging system, where two separate cylindrical elements share the imaging function, one cylindrical element must necessarily be closer to the object surface than the other. This necessitates the use of cylindrical elements of different radii of curvature, as well as a non-spherically curved object surface. Referring to FIGS. 4A and 4B, element 14 will have a shorter radius of curvature than element 12 since "useful" object light, as explained below, will be reflected by element 12 first before being reflected from element 14. For example, when element 14 has a radius of curvature of, say, 11.5 inches, the radius of curvature of element 12 may be, say, 15.0 inches, depending on the actual spacing between the se elements.

Because of the above-mentioned difference in radius of curvature of elements 12 and 14, an anamorphosing effect is introduced to the imaging system. That is, were surface 16 to have a spherical shape, a distorted image thereof would be projected at infinity. One technique for correcting or compensating for this distortion is to shape surface 16 to have unequal radii of curvature measured in mutually perpindicular planes. Specifically, surface 16 can be shaped so that its radius of curvature about a vertical axis is one-half the radius of curvature of element 14 about the same axis, and its radius of curvature about a horizontal axis is one-half the radius of curvature of element 12 about the same axis. Thus, in the above example, the radii of curvature of surface 16 about vertical and horizontal axes would be 5.75 and 7.5 inches, respectively. The required shape for surface 16 can be readily produced by conventional glass-blowing or sagging techniques. Other methods for compensating for the above-mentioned distortion will suggest themselves to skilled artisans, for example, projecting a "predistorted" image onto an aspherical surface 16, such distorted image being automatically corrected when projected by the "cylindrical" infinity display system of the invention.

Now, the manner in which an image of an object displayed on surface 16 is projected at infinity will be described. Because there are, in effect, two infinity imaging systems intermixed here, one for horizontal focus, and one for vertical focus, each will be described separately. Referring to FIG. 4a which is a top view of the optical components, "useful" object light (i.e., light which does not go into the formation of ghost images) emanating from only the vertical lines of an image on surface 16, passes through elements 18, 12 and 22 and strikes the cylindrical beam-splitter 14. The reflective properties of the latter redirects such light back toward its source. Owing to the fact that element 14 is concentric, in this view, with object surface 16 and, in a plane normal to the plane of the drawing, is cylindrically curved at twice the radius of curvature of such surface 16, an image of such vertical object lines will be focused at infinity (by definition of the catadioptric imaging system which defines this ray trace). A portion of the light which has just reflected from element 14 will strike beam-splitter 12 and be reflected thereby toward the viewer's eyes. Since beam-splitter 12 has no curvature in this view and, hence no optical power in the vertical plane, it reflects the object light without modifying the focus of the image of vertical lines. The light passes through elements 22, 14, 24 and 20 to be seen by the viewer who is visually accomadated at infinity.

Similarly, referring to the side view of FIG. 4b, "useful" object light eminating from only the horizontal lines imaged on surface 16 passes through elements 18, 12 and 22 and strikes beam-splitter 14. A portion of this light is reflected back toward the source without imparting any focusing. A portion of this light is transmitted by element 22 and is reflected by beam-splitter 12 toward the viewer. If this optical path were unfolded about element 14, beam-splitter 12 would be concentric with and twice the radius (in this view) of surface 16. Again, this defines a catadioptric imaging system. A portion of the light which has just been reflected from beam-splitter 12 passes through elements 22, 14, 24 and 20 to be seen by the viewer who is visually accomadated at infinity.

As indicated earlier, the polarizers 18 and 20 and quarter-wave plates 22 and 24 function only to suppress ghost images, and serve no imaging functio as such. A detailed description of the manner in which these elements cooperate to achieve this function is described in detail in the aforementioned '858 patent.

A refractive analog of the above imaging system would be two cylindrical lenses of different focal lengths arranged wtih their respective axes of curvature crossed perpindicularly, each lens being at its own focal length from a comman target.

According to a particularly preferred embodiment, the cylindrical beam splitter elements are not formed from a conventional glass blank. Rather, they are shaped from thin sheets of acrylic or other transparent plastic, or bendable glass sheets which can, if desired, be chemically treated to increase their ability to flex to a relatively small radius of curvature (e.g. 11.5 inches). A preferred thickness range for such plastic or glass sheets is between about 0.002 and 0.100 inches. Flexible, high quality glass sheets os such thickness are commercially available from Corning Glass Works, Corning, N.Y. (under the trademark Micro-Sheet) and from Artistic Glass Products Company, Trumbauersville, Pa. Such glass sheets can be rendered partially reflective, and therefore partially transparent, by vapor depositing or sputtering a thin film of silver or aluminum on one surface thereof. A cylindrical shape can be imparted by mechanical means, such as by applying a pure bending moment to the opposing edges of the sheet, or by coupling it to a rigid rectangular frame of the type shown in FIGS. 2 and 3.

Figure 2:
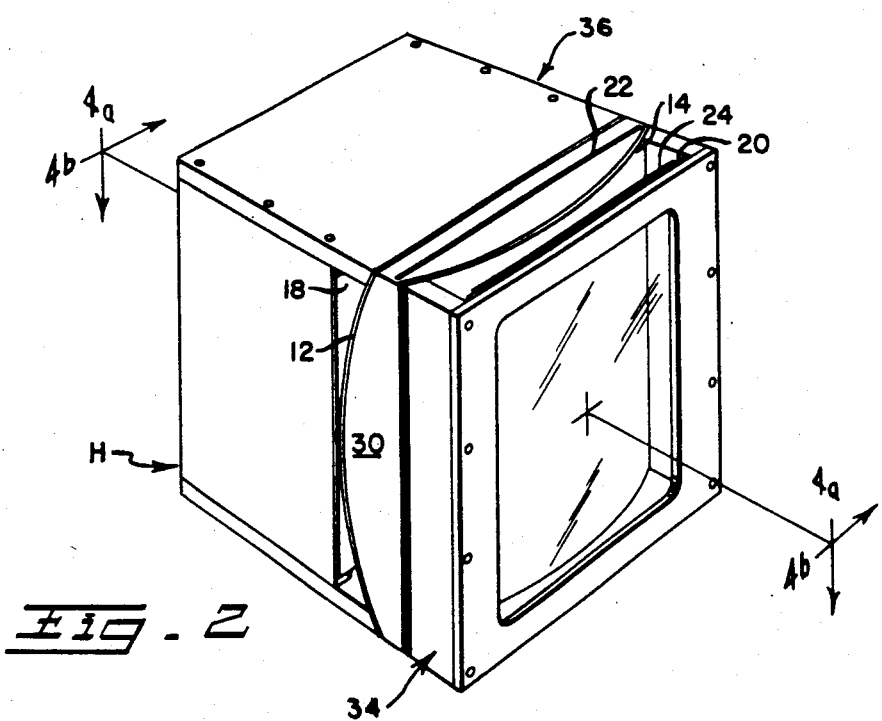
FIG. 2 shows the optical elements of FIG. 1 in a supporting housing.

Referring to FIGS. 2 and 3, frame 30 forms part of a viewing housing H which encompasses screen 16. The forward-facing surfaces 31a, 31b, 31c and 31d, of frame 30 are configured to impart the requisite cylindrical shape to a flexible glass or plastic sheet fastened or clamped thereto (e.g. by the front piece 34 of housing H), such shape being curved about a vertical axis. Similarly, the rearward-facing surfaces 32a, 32b, 32c and 32d of frame 30 are configured to impart a cylindrical shape to a flexible glass or plastic sheet fastened or clamped thereto, (e.g. by the rear piece 36 of housing H), such shape being curved about a horizontal axis. As indicated by the above discussion, the radius of curvature of surfaces 31a and 31c is somewhat different from the radius of curvature of surfaces 32b and 32d.

To this point, the preferred embodiment of the invention has been described as comprising a total of six optical elements, viz., cylindrical beam-splitters 12 and 14, linear polarizers 18 and 20, and quarter-wave plates 22 and 24. However, because all these elements can be made thin and flexible, several of these elements can be physically combined. For example, polarizer 18 and quarter-wave plate 22 can be "optically bonded" to the intermediate beam-splitter 12 on their respective sides thereof. Likewise, quarter-wave plate 24 and polarizer 20 can be optically bonded to beam-splitter 14, maintaining the sequence of elements shown in FIG. 1. The expression "optical bonding" refers to the bonding of two optical elements usig an adhesive having a refractive index which matches, as closely as possible, the refractive index of the elements. Such bonding minimizes the number of refractive index changes (air-to-glass or plastic, and vice versa) and the adverse optical effects thereof. In the FIG. 1 imaging system, there are twelve such index changes; this number can be reduced to four by the bonding technique described above.

Referring to FIG. 6, a further advantage of the optical bonding technique described above is that the cylindrical beam-splitter elements can actually be eliminated! By making the far side (the side closer to surface 16) of quarter-wave plate 22 partially reflective and, upon bonding it to polarizer 18, giving the bonded elements a cylindrical sector shape, these elements will additionally function as beam-splitter 12, eliminating the need for that part. Similarly, by bonding elements 20 and 24 together, coating the exposed surface of element 24 to make it partially reflective, and cylindrically curving the bonded elements, the need for beam-splitter 14 is eliminated. In this manner, the part count is minimixed, there being only two discrete laminated parts,exclusive of the frame. This has the advantage of reducing the cost of the shaping frame, and the time and precision required to assemble the optical package. The undesired reflections on the remaining index-changing surfaces can be virtually eliminated with conventional anti-reflection coatings commonly used on camera lenses for the same purpose.

The invention has been described in detail with respect to particularly preferred embodiments. It will be understood, of course, that modifications can be made without departing from the scope of the invention, as defined by the following claims.

I claim:

1. Apparatus for projecting at infinity an image of an object displayed on a convex surface, said apparatus comprising: (a) a pair of beam-splitters disposed on an optical axis between said surface and a would-be observer, each of said beam splitters comprising a flexible, semi-transparent, semi-reflective sheet; and (b) means for imparting a substantially right cylindrical sector shape to each of said sheets, and for orienting said sheets such that the axis of curvature of one sheet is substantially perpindicular to axis of curvature of the other sheet.

2. The aparatus of claim 1 further comprising (a) a pair of flexible plane polarizing plates positioned on the optical axis with said cylindrically shaped sheets positioned therebetween; (b) a pair of flexible quarter-wave plates positioned on the optical axis on opposite sides of the cylindrically shaped sheet closer to the object surface; and means for integrally coupling one of said plane polarizing plates, to each of said sheets.

3. The apparatus of claim 2 further comprising means for integrally coupling one of said quarter-wave plates to each of said sheets.

4. The apparatus of claim 1 wherein said shape-imparting means comprises a rigid rectangular frame having a top, bottom and a pair of opposing sides, each of the opposing sides having substantially flat front and arcuate rear surfaces, and the top and bottom having substantially flat rear and arcuate front surfaces, means for coupling one of said flexible sheets to the arcuate front surfaces of said frame, and means for coupling the other flexible sheet to the arcuate rear surfaces of said frame.

5. The apparatus of claim 1 wherein each of said sheets comprises glass and has a thickness between 0.002 and 0.100 inch.

6. Apparatus for projecting at infinity an image of an object displayed on a convex surface, said apparatus comprising a pair of crossed cylindrical beam-splitters disposed on an optical axis between the surface and a would-be observer, each of said beam-splitters comprising a flexible, semi-transparent, semi-reflective quarter-wave plate, a flexible plane polarizing plate which is laminated to said quarter-wave plate, and means for imparting a right cylindrical shape to each laminated structure.

* * * * *